INVENTORS.
RICHARD F. PREDMORE
FRANK D. JONES
G. HARVEY SHRIVER

BY

ATTORNEY

Feb. 6, 1968   R. F. PREDMORE ETAL   3,367,475
TOBACCO LEAF ORIENTING MEANS

Filed July 25, 1966   3 Sheets-Sheet 2

*INVENTORS.*
RICHARD F. PREDMORE
FRANK D. JONES
G. HARVEY SHRIVER

BY

ATTORNEY

United States Patent Office 3,367,475
Patented Feb. 6, 1968

3,367,475
TOBACCO LEAF ORIENTING MEANS
Richard Frank Predmore, East Moline, and Frank De Lloyd Jones and George Harvey Shriver, Moline, Ill., assignors to Deere & Company, Moline, Ill., a corporation of Delaware
Filed July 25, 1966, Ser. No. 567,583
3 Claims. (Cl. 198—33)

ABSTRACT OF THE DISCLOSURE

A tobacco harvester having a priming station for selectively removing tobacco leaves from a growing plant, a conveyor to carry the primed leaves away from the priming station, a device for orienting the leaves received from the conveyor, and a collecting device to receive the leaves from the orienting device.

---

The present invention relates generally to tobacco harvesting equipment, and more particularly to devices for orienting tobacco leaves after they have been primed.

Tobacco in the United States is harvested by one of two methods, the first being by "priming" in which the leaves are picked individually from the plant from time to time as they ripen, and the second is by stalk cutting in which the entire plant or stalk is cut. Over 60% of the United States tobacco acreage is classed as flue-cured tobaccos, and this form of tobacco is harvested by the priming method. According to this method beginning at the bottom two to four leaves are picked from the stalk at a time. The fields must be gone over from four to six times in order to get all the leaves at the right stage of ripeness. The leaves of flue-cured tobacco are then prepared for hanging in the curing barn by forming them into groups of three or four leaves with the butts of the leaves being secured together, the groups of leaves then being strung onto a stick. This form of harvesting requires over half the man hours required to raise one acre of tobacco, it being estimated that approximately 400 man hours are required to raise one acre of tobacco. This may be contrasted to the average amount of labor, about eight hours, needed to raise an acre of wheat.

Various harvesting devices have been proposed in the past to reduce the labor requirements for harvesting flue-cured tobacco. One form of harvesting device is shown in the U. S. patent to Long, 2,704,158, issued Mar. 15, 1955. In this form of harvester the workers are carried on a machine past the plants, the workers removing the leaves by hand from the plants and placing them on a conveyor where they are taken to a station where they are placed on sticks. This form of harvesting apparatus has met with some commercial success but has not materially reduced the man hours required to raise an acre of tobacco. A second form of harvesting apparatus is shown in United State patent application Ser. No. 481,229, filed Aug. 20, 1965. In this form of tobacco harvester tobacco leaves are primed from their stalks and conveyed by belts to a collecting device, the leaves subsequently being removed from the collecting device to be formed into groups with the butts together, the groups then being placed on sticks. The defoliating mechanisms may be of the types shown in U. S. Patents 2,816,411 to Wilson, 2,834,173, also to Wilson, 2,834,174, to Suggs et al., or 3,093,949, to Splinter. This form of harvester has not been commercially successful since it has been difficult to form the tobacco leaves into the groups for placing on sticks after they have been thrown into the collecting means in a helter-skelter fashion. Thus while the labor has been reduced in removing the tobacco from the stalks, additional labor has been required for forming the tobacco into oriented groups and placing them on the sticks. Thus the net labor reduction has been negligble.

Another approach is shown in the U.S. patent to Wilson No. 3,083,517, dated Apr. 2, 1963. In the Wilson harvester the leaves are placed into racks for bulk curing which does not require that the leaves be formed into oriented groups for curing. This form of harvester also has not met with significant commercial success since bulk curing has not been widely adopted by the tobacco industry.

The principal object of this invention is to provide an apparatus for placing priming tobacco leaves into a collecting device in an oriented manner so that their subsequent handling is facilitated.

Another object of this invention is to provide means which may be associated with a tobacco priming apparatus for orienting the tobacco leaves prior to the time they are received within the collecting means associated with the priming apparatus.

Another object of this invention is to provide means for orienting tobacco leaves, the means orienting the leaves by positioning them in such a manner that the long direction of all leaves is parallel to each other.

Another object of this invention is to provide means for orienting tobacco leaves in which the more dense or heavy butt end of the tobacco leaf is sensed and oriented in such a manner that the butts all lie together These and other objects and advantages of this invention will be apparent to those skilled in the art after a consideration of the following detailed description, taken in conjunction with the accompanying drawings in which the preferred forms of this invention are illustrated.

Figure 1:
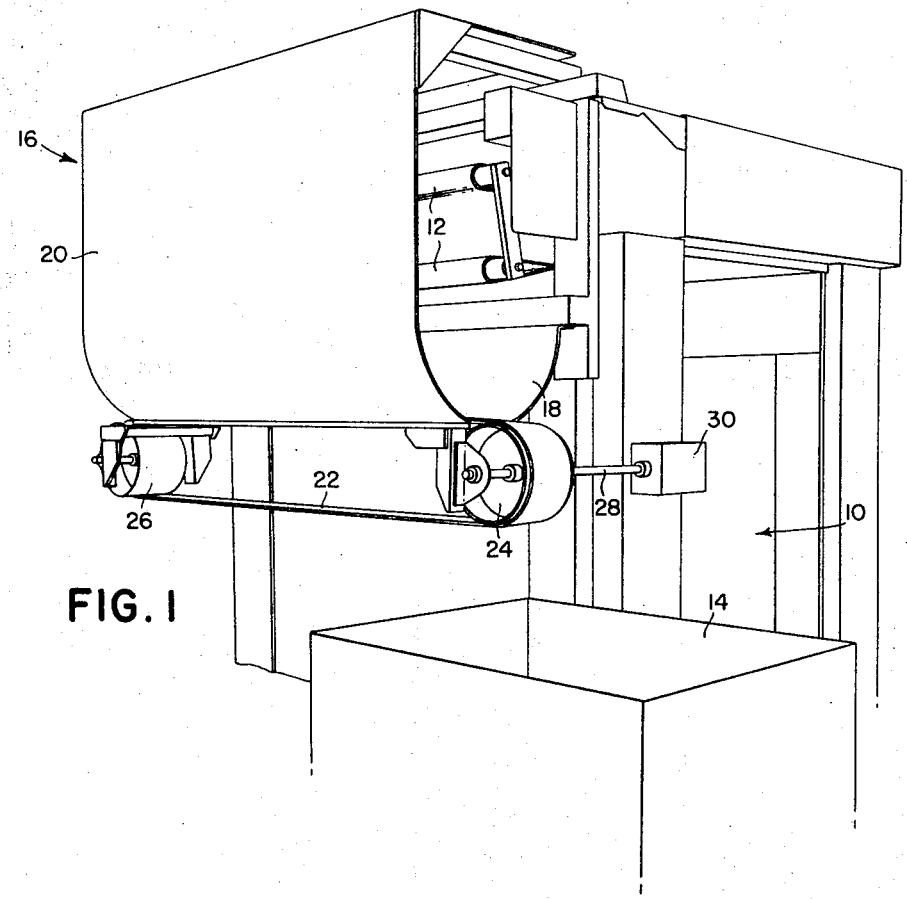
FIG. 1 is a perspective view of one form of leaf orienting mechanism associated with a portion of a tobacco harvester.
Figure 4:
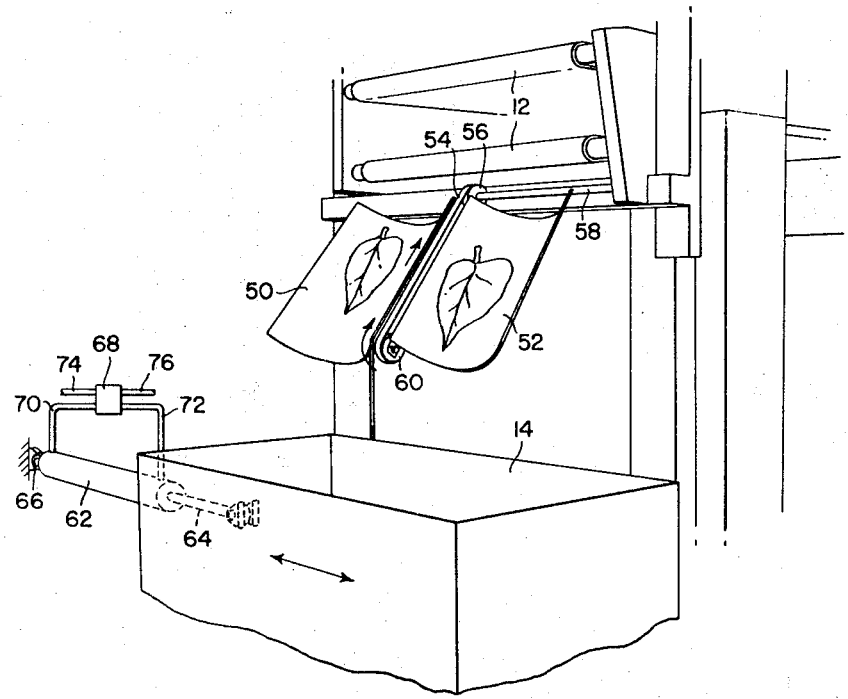
FIG. 4 shows another form of leaf orienting mechanism associated with a tobacco harvester.
Figure 5:
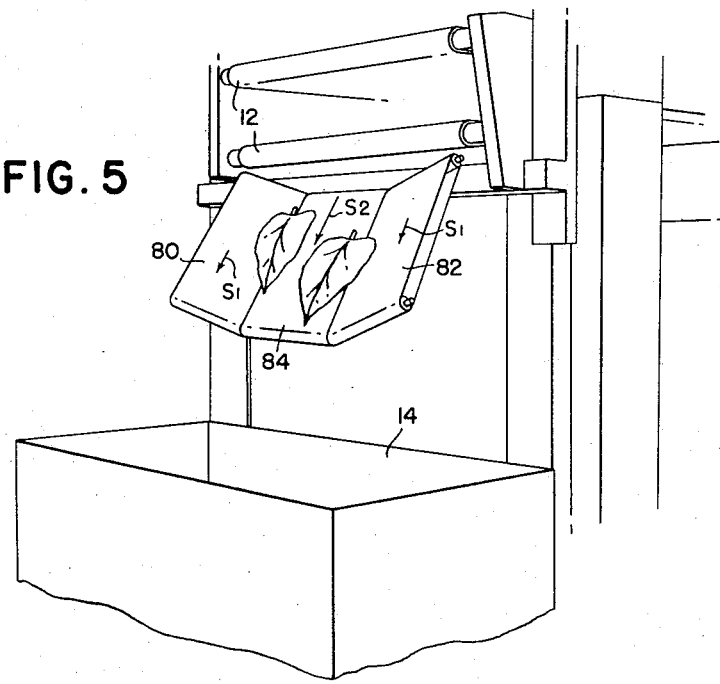
FIG. 5 shows still another form of leaf orienting mechanism associated with a tobacco harvester.

In FIGS. 1, 4 and 5 a portion of a tobacco harvester is illustrated. This tobacco harvester is of the type more fully disclosed in United States application Ser. No. 481,229, filed Aug. 20, 1965, and includes a defoliating or priming station 10 (FIG. 1), conveying belts 12 adapted to convey the leaves from the priming station 10 to a collecting means or hopper 14. The tobacco harvester is adapted to be propelled forwardly over the ground by a tractor (not shown) and is more fully described in the aforesaid application.

Referring now more in detail to FIG. 1 the orienting means shown in this figure and indicated generally at 16 includes a trough extending transversely to the conveying belts and having one side 18 disposed entirely below the discharge end of the belts 12, the other side 20 being disposed away from the ends of the belts 12 and spaced sufficiently high so that any leaves being discharged from the belts will contact the other side 20 and be confined within the trough. Disposed within the bottom of the trough 16 is an endless belt 22, one end of which is disposed over drive roller 24 and the other end being disposed over idler roller 26. Roller 24 is driven by any suitable means such as for example a drive shaft 28 extending outwardly from a gear box 30 that is in communication with the drives for the belts 12.

The mechanism shown in FIG. 1 works as follows: The leaves are discharged from the belts 12 in random order into the trough 16. When making contact with the trough, which is narrow enough not to accept the leaf crosswise, it is forced to lie at some angle less than 45°. This angle is measured between the long axis of the leaf and the long axis of the trough or belt. It should be noted at this point that the tobacco leaves are longer than they are wide and this feature is relied upon in the modifications shown in FIGS. 1–6 for orienting the leaves. The relative movement between the belt 22 and the sides of the trough 18, 20 will then complete the act of aligning the leaf. The leaf is then discharged into the collecting means 14.

Figure 2:
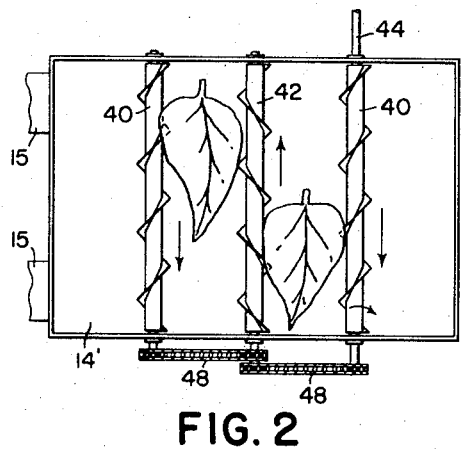
FIGS. 2 and 3 show another form of leaf orienting mechanism associated with the collecting hopper shown in FIG. 1.
Figure 3:
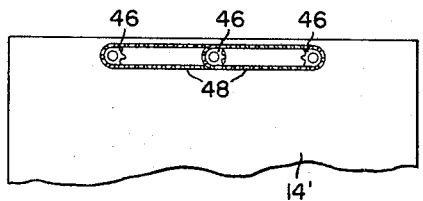

In FIGS. 2 and 3 another form of leaf orienting mechanism is shown. This form of orienting means also relies upon the relative movement of two or more relatively movable means and the dimensions of the leaf to orient the leaves. Thus the collecting means 14' is provided with a plurality of auger flights 40, 42 disposed adjacent the top of the collecting means, with every other flight being adapted to convey material in a different direction as indicated by the arrows. Thus for example the auger flights 40 are provided with a right-hand screw while the flights 42 are provided with a left-hand screw. Clockwise rotation as viewed from FIG. 3 will cause the flights 40 to convey material to the left and flights 42 to the right. Thus if a leaf is placed crosswise upon flights 40, 42 it will be turned until it can fit between the flights 40, 42. In this connection it should be noted that the leaves will vary greatly in size having a range in length from about 12 to 30 inches, however most are from 20 to 24 inches long. The width is usually about one-half the length. Thus the flights 40, 42 are spaced approximately 14 inches apart. Very few leaves will fall crosswise between the flights while nearly all leaves will have to be rotated until their length is parallel to the flights before they will drop between them. The auger flights are driven in any suitable manner such as by a power driven shaft 44 which is driven from the tobacco harvester in any conventional manner and a sprocket 46 and chain 48 drive.

The collecting means 14' is supported on a fork lift 15 disposed below the ends of the belts 12 and to one side of the priming station 10.

Another variation is shown in FIG. 4. In this variation a pair of troughs 50, 52 are disposed parallel to each other and closely adjacent. As can be seen from the figure, the upper ends of each of the troughs are disposed adjacent the discharge ends of the belts 12 and the lower ends are disposed outwardly from the harvester and above the hopper or collecting means 14. A V-belt 54 is disposed between the two troughs and is rotated through a drive sheave 56 and drive shaft 58 in such a manner that its upper flight will move toward the discharge end of the belts 12 in the manner indicated by the arrows. The lower outward end of the belt 54 is supported on sheave 60.

In operation the leaves will contact the troughs 50, 52 and will tend to orient themselves so that their longest dimension is parallel to the belt 54. Should a leaf happen to land crosswise on the belt or troughs, the belt 54 will engage a portion of the leaf and tend to turn it so that it becomes oriented.

To insure even distribution of the oriented leaves within the hopper 14 it is desirable to oscillate the hopper below the discharge end of the orienting means. To this end a hydraulic cylinder 62 may be provided having an extensible and retractable rod 64, the rod being secured to the hopper 14 which is in turn supported on rollers so that it may be moved, the other end of the cylinder 62 being rigidly secured on a fixed mounting bracket 66. The cylinder is interconnected with a reversing valve 68 through fluid lines 70, 72, the valve 68 being in turn connected with a source of fluid under pressure on the tractor through an input line 74 and a discharge line 76.

In operation the container 14 will be oscillated in the manner indicated by the arrows as the rod 64 is caused to extend and retract from the cylinder 62. It should be noted at this point that the oscillating mechanism described in connection with FIG. 4 could also be used with the container 14 in FIG. 1 wherein the container could be caused to reciprocate in a transverse manner. Also the reciprocating mechanism could be used with the container shown in FIG. 5.

In the modification shown in FIG. 5, three belts are provided at the discharge end of the conveyor belts 12. The outer belts 80 and 82 are rotated at one speed in any conventional manner and the inner belt is rotated at a second faster speed also in any conventional manner. The relative speed of the belts is indicated by the arrows $S_1$ and $S_2$. The belts are preferably disposed in such a manner that they form a trough.

In operation as the leaves are dropped onto the belts they will tend to move towards the center belt due to the slope of the outer belts 80, 82 and the central faster moving belt will tend to turn them so that they align themselves with their long direction being parallel to the belts.

Figure 6:
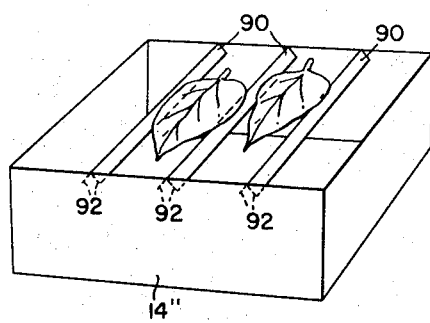
FIG. 6 shows another form of leaf orienting mechanism associated with the collecting mechanism normally carried by a tobacco harvester.

In the modification shown in FIG. 6 a somewhat different principle is used to orient the leaves. Thus the collecting means 14'' is provided with a plurality of parallel members 90. The distance between adjacent members 90 is less than the length of the average mature flue-cured tobacco leaf but slightly greater than the width of said leaf. As pointed out before, this would be generally in the neighborhood of 14 inches. As the leaves contact the parallel members 90, they will tend to slide down the edges 92 and as they slide into the collecting chamber 14'', they will tend to orient themselves by turning around.

Figure 7:
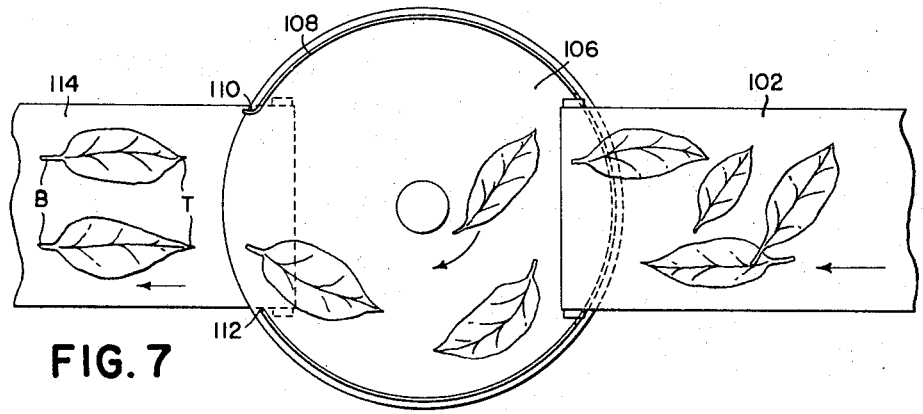
FIGS. 7 and 8 show another form of leaf orienting mechanism.
Figure 8:
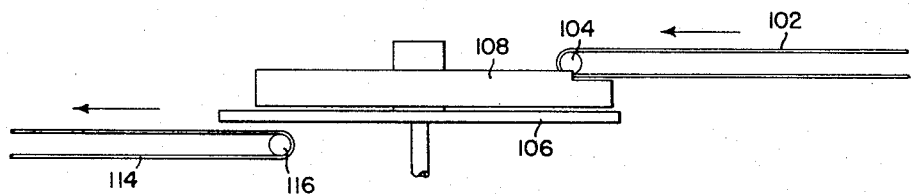

In FIGS. 7 and 8 a different form of orienting mechanism is illustrated. This form of orienting mechanism relies not upon the relative dimensions of the leaf for orientation but rather upon the fact that the butt ends B of the leaves are denser than the tips T of the leaves. According to this form of the invention the leaves are placed on a first belt 102 in a random fashion, the first belt having one end disposed over an idler roll 104 which is in turn disposed over a rotatable table 106. Disposed about the circumference of the turntable 106 is a rim 108 which is cut away at 110 and 112 to provide an opening over a second belt 114. The end of the belt 114 adjacent the turntable is supported by an idler roller 116 which is disposed below the surface of the turntable. In operation the leaves are discharged from the belt 102 onto the turntable 106 wherein the heavy butt ends B of the leaves are thrown against the rim 108 by centrifugal force. As the butts come to the opening between the edges 110 and 112, they are discharged onto the second belt 114 with all the butts pointing in the same direction. This form of orienting causes all the butts to point in the same direction while the forms illustrated in FIGS. 1–6 will only cause the butts or tips to be pointed in the same direction.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. In a tobacco harvester adapted to be propelled over a field and having a priming station for selectively removing tobacco leaves from a growing plant, collecting means for receiving the primed leaves, and means for conveying said removed tobacco leaves away from said priming station to said collecting means, the combination therewith of means to orient said tobacco leaves after they have been conveyed away from said growing plant and before they are received within said collecting means, said leaf orienting means including an arcuate trough disposed transversely of said conveying means and having downwardly extending spaced apart sides which gradually converge toward each other, and an endless conveyor means disposed in the bottom of the trough, the width of the endless conveyor means being less than the average width of a primed tobacco leaf, and means operable to move said endless conveyor means relative to the trough whereby a leaf conveyed onto said orienting means and contacting said trough and said endless conveyor means will be turned by the relative motion of the endless conveyor means to the trough to a position wherein the long axis of the leaf is generally parallel to the endless conveyor means.

2. The tobacco harvester set forth in claim 1 in which the upper end of one of said spaced apart sides is disposed below the discharge end of the first-mentioned conveying means.

3. The tobacco harvester set forth in claim 1 in which means are provided to reciprocate the collecting means below the discharge end of said structures.

References Cited

UNITED STATES PATENTS

| | | | |
|---|---|---|---|
| 2,192,518 | 3/1940 | Eissmann | 198—33 |
| 2,618,373 | 11/1952 | Hathaway | 198—33 |
| 2,758,697 | 8/1956 | Schultz | 198—30 |
| 2,816,411 | 12/1957 | Wilson | 56—27.5 |
| 2,973,548 | 3/1961 | Walker | 198—33 |
| 3,268,057 | 8/1966 | Ross | 198—33 |

EDWARD A. SROKA, *Primary Examiner.*